United States Patent [19]

Leroux

[11] Patent Number: 5,703,686
[45] Date of Patent: Dec. 30, 1997

[54] DEVICE FOR COLORIMETRIC MEASUREMENT OF A DISPLAY SCREEN

[75] Inventor: Thierry Leroux, Oustreham, France

[73] Assignee: Eldim, France

[21] Appl. No.: 583,230

[22] Filed: Jan. 5, 1996

[30] Foreign Application Priority Data

Jan. 6, 1995 [FR] France .................................. 95 00118

[51] Int. Cl.⁶ ........................................................ G01J 3/51
[52] U.S. Cl. ............................ 356/418; 250/226; 356/419
[58] Field of Search ................................ 356/418, 419; 250/226

[56] References Cited

U.S. PATENT DOCUMENTS 4,648,714  3/1987  Benner et al. ........................... 356/418

FOREIGN PATENT DOCUMENTS 0286529  10/1988  European Pat. Off. .
2952154  10/1980  Germany .

OTHER PUBLICATIONS

International Search Report Re France Application 9500118.

*Primary Examiner*—Vincent P. McGraw
*Attorney, Agent, or Firm*—Baker & Daniels

[57] ABSTRACT

Measurement device, for the colorimetric measurement of a display screen. The device includes a first lens which forms the image of the Fourier transform of the elementary surface to be measured. An optical system is used to form a second lens which projects the image of the transform onto a set of detectors. The second lens (10) comprises an input lens (11) after the image plan (Fi) of the first lens (1), a colour filter (12) formed by filters (12*l*) which are associated with each colour, an output lens (13), downstream of the colour filter (12) for focusing the beams onto the detectors (7*i*, *J*) of the sensor (7), and a processing circuit (18).

5 Claims, 2 Drawing Sheets

DEVICE FOR COLORIMETRIC MEASUREMENT OF A DISPLAY SCREEN

The present invention relates to a device for colorimetric measurement of a display screen, in particular a liquid-crystal screen, for determining the luminance and the colorimetric coordinates of an elementary surface of the screen along the observation direction of this elementary surface, which device comprises:

- a first converging lens forming the image of the Fourier transform of the elementary surface in its image focal plane,
- a second converging lens projecting the image of the transform onto a sensor formed by a set of detectors distributed in a matrix, each detector giving an electric signal proportional to the light intensity of the elementary surface,
- a diaphragm situated in the path of the light beams, for defining the aperture of the elementary surface,
- a circuit for precessing the electric signal produced by each detector of the sensor, in order to determine the contrast.

Such a device is already known from Document FR-87 04 944.

In general, regardless of their structure, the characteristics of display streams and, in particular, liquid-crystal display screens, exhibit readability which varies very greatly as a function of the observation direction. This characteristic corresponds to the contrast, which is the ratio between the illuminated state and the unilluminated state of the elementary surfaces of the screen.

In order to assess the quality of a screen, a techniques has been developed for measuring the con, rest along the observation direction, and it is known in this way to plot curves corresponding to a given contrast (isocontrast curves). Such analysis is indispensable to screen manufacturers for monitoring the quality of their product, both during manufacture and at the final stage. This analysis also makes it possible to make a comparison between different production runs.

The known principle of measuring the contrast a screen is illustrated in FIG. 1. According to the principle, the contrast of the elementary surfaces 2, an example of which is represented, is analysed in order to measure the contrast of a screen 1.

This analysis is carried out for each elementary surface 2.

In order to do this, the XY coordinate axes were plotted in the plane of the screen 1. The normal centre O of the elementary surface 2 is the Z axis.

A photosensitive detector 3 is pointed at the elementary surface 2 and analyses the image of the state in order to measure its contrast, i.e. the ratio between these two quantities, associated with a given orientation of the photosensitive detector.

The directions at which the schematically represented photosensitive detector 3 measures are defined by two angles, namely, on the one hand, the angle made by the ray R leaving the point O and striking the photosensitive detector 3 with the normal Z. This angle is called θ.

The orientation angle around the Z axis is also defined, i.e. the angle made by the plane passing through the ray R and the Z axis with a reference direction, for example the OY direction. This angle is called φ.

Measurement of the contrast of the surface element 2 consists in taking multiple measurements while changing the angle θ in the ZOP plane, with the angle φ remaining contrast. The angle φ is then changed and the operations are repeated.

In application of the principle explained above, the measurements were previously taken using equipment comprising a photodetector 3 that is aligned with the centre O and can move over a spherical surface of centre O, in order to carry out analysis in terms of the different angles θ, φ.

When all the measurement had been taken for an elementary surface 2, the screen 1 was moved in order to place a new elementary surface at the sighting centre O, and the various measurements were repeated.

These onerous methods have been replaced by the measurement device defined above in document FR-87 04 944.

According to the principle developed in this document, an overall measurement is taken with a sensor formed by detector elements distributed in a matrix. Each detector element is associated in one-to-one fashion by the optical system with one emission direction (one pair of angles φ, θ).

This measurement principle thus make it possible, in a single step, to measure the contrast for an elementary surface in all directions. The resolution of the measurement, i.e. the number of angle pairs (θ, φ) for which the measurement is taken depends on the number of detector elements in the sensor.

However, the qualities of a display screen depend not only on the contrast of the elementary surface between the displayed state and the undisplayed state, but also on the colours of this elementary surface in its displayed state and its undisplayed state.

The object of the present invention is to create a device for colorimetric measurement of a display screen, in particular a liquid-crystal display screen.

For this purpose, the invention relates to a measurement device corresponding to the type defined above, characterized in that the second lens is an optical system comprising, in the direction of propagation of the beams:

- an input lens,
- a colour filter,
- an output lens,
- the input lens, located after the image plane of the first lens, converting the convergent beams into parallel beams for passing through the colour filter,
- the colour filter being formed by a set of filters which are associated with each analysed colour and which can be placed, on demand, in the path of the light beams at the exit of the input lens,
- the output lens located downstream of the colour filter, receiving the parallel beams leaving the filter to focus them onto the detectors of the sensor, and
- the circuit for processing the signals from the sensor controls the switching of the colour filters for analysing the different colours and the processing of the respective signals as a function of their recording and/or display.

The device according to the invention allows automatic analysis of a display screen according to the different colours. A system for weighting the signals delivered by the sensor is associated with each colour, in order to give a color/metric map of the screen with isocontrast zones or curves associated with each colour. The signals associated with each colour can be weighted in accordance with the physiological perception of each colour.

According to another characteristic of the invention, the device comprises a diaphragm defining the image of the elementary surface analysed, this diaphragm being placed upstream of the output lens of the optical system.

According to another characteristic of the invention, the device comprises a semitransparent plate placed between the diaphragm and the output lens, for sampling a fraction of the light beams and imaging the measurement zone using a transfer lens and an eyepiece.

By forming the image of the analysed surface it is possible to examine this image through the eyepiece or to project it onto a display surface in order to record it or study it.

The present invention will be described below in more detail with the aid of the appended drawings, in which.

Figure 1:
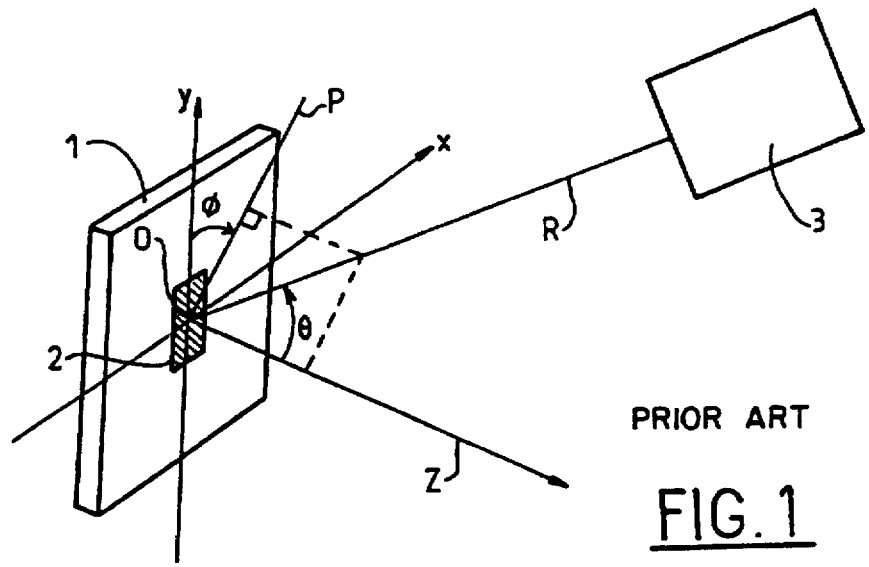
FIG. 1 is a diagram of the principle of analysis of a display surface.
Figure 2:
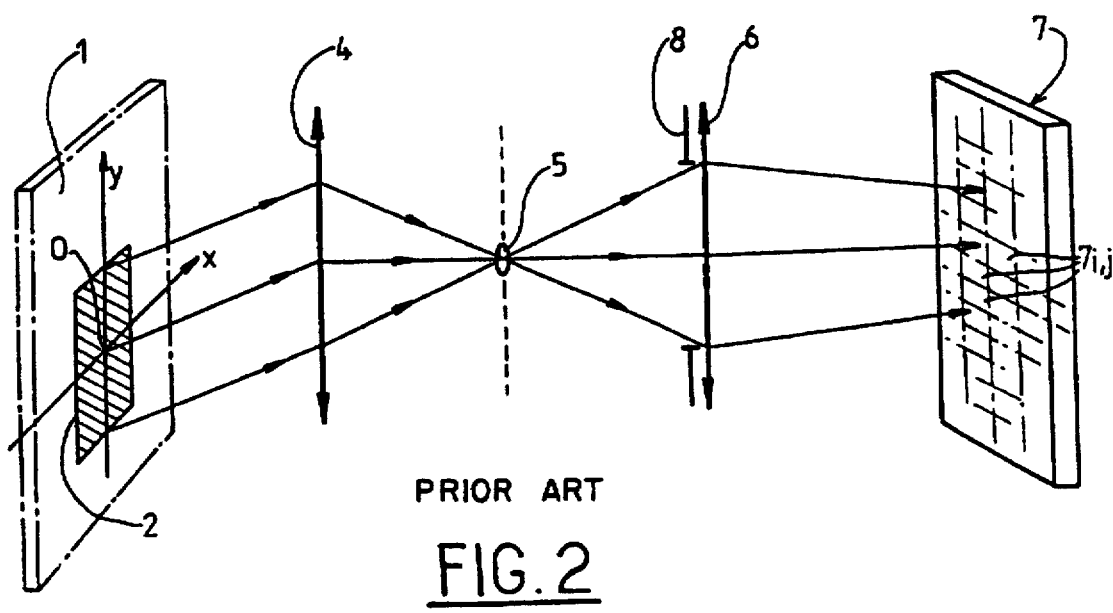
FIG. 2 is a diagram of the contrast measurement equipment according to the prior art.

According to FIG. 2, the known equipment, intended to measure the contrast of the screen 1 by successively analysing the various elementary surfaces 2, comprises a first lens 4 giving an image 5 of the elementary surface 2. This image is the Fourier transform of this surface. A second lens 6 collects this image 5 and projects it onto the sensor 7 formed by detector elements 7i, j with coordinates Xi, Yj in the plane of the sensor 7. Each detector element 7i, j is associated in one-to-one fashion with one light beam direction emitted by the elementary surface 2.

The second lens 6 is preceded by a diaphragm 8 which defines the size of the elementary surface 2.

Figure 3:
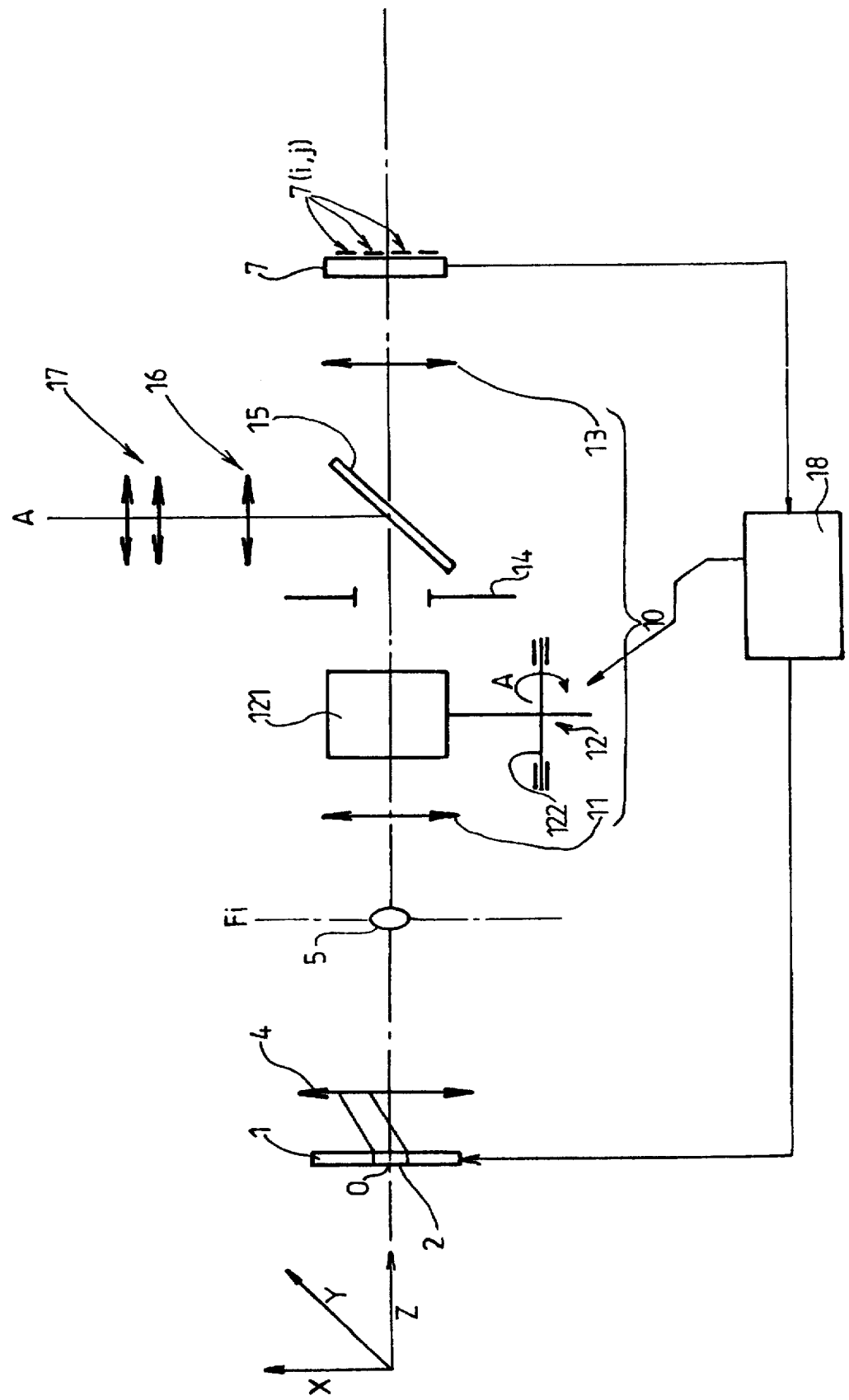
FIG. 3 is a diagram of the device according to the invention for colorimetric measurement of a display screen.

The colorimetric measurement device according to the invention (FIG. 3) is composed of a first lens 4 which four from the elementary surface 2 of the screen 1, the image 5 of the optical Fourier transform of this surface in its image focal plane (Fi). This image 5 is collected by an optical system 10 which projects it onto a sensor: 7 formed by detector elements (7i, j) distributed in a matrix, such as the element 7i, j in FIG. 2.

The optical system 10 is composed of an input lens 11, a colour filter 12 and an output lens 13. The input lens 11 collects the beams of the image 5 to convert them into parallel beams intended for filter 12. At the exit of the filter 12, the parallel beams are collected by the output lens 13 which focuses them onto the detector elements (7i, j) of the sensor 7.

The colour filter 12 actually consists of a plurality of colour plates 121 which be placed one by one in the light path between the lenses 11 and 13 in order to filter the light beams according to colour.

As schematically represented, these colour plates 121 are placed on a movable element, for example a disc rotating about its axis 122 (arrow A) in order to place the appropriate filter in the path of the light beams, successively or as a function of the chosen colour.

The output lens 13 is preceded by a diaphragm 14 which defines the analysed surface, i.e. the aperture of this diaphragm 14 is chosen as a function of the surface element 2 analysed.

This diaphragm 14 and the surface element 2 are optically conjugate, i.e. an image of the surface 2 is formed in the plane of the diaphragm 14.

According to the invention, the device includes, downstream of the diaphragm 14, a semi-transparent plate 15 which deviates a fraction of the light through a transfer lens 16, and an eyepiece 17 making it possible to examine the image of the surface element visually. This also makes it possible to project this image onto a screen or an imaging system.

The installation also comprises a processing circuit 18 which processes the signals from the detector elements of the sensor 7 and controls the sequence operations, i.e. indexed positioning, for example rotation, of the filters 121 and movement of the screen 1 in order to bring each surface element 2 successively into the analysis position.

The processing circuit 18 scans the sensor 7 in order to receive and process the signals associated with each detector element (7i, j) and to compensate these signals as a function of the calibration of the system; these compensations depend on the transmission of the optical system according to angle or type of the filters used. The data obtained for the contrast or colorimetry are recorded with a view to interpreting them, either displaying or by plotting contrast or colorimetry maps.

I claim:

1. A colorimetric measurement device for determining the luminance and the colorimetric coordinates of an elementary surface of a display screen along the observation direction of the elementary surface, said device comprises:

a first converging lens collecting light beams and forming an image of a Fourier transform of the elementary surface in an image focal plane of the first converging lens, the light beams having a direction of propagation and defining a path, a second converging lens projecting the image of the transform onto a sensor formed by a set of detector distributed in a matrix, each of the detectors producing an electric signal proportional to the light intensity of the elementary surface, a diaphragm situated in the path of the light beams and defining an aperture, a circuit for processing the electric signal produced by each of the detectors to determine contrast values, wherein the second lens is an optical system comprising, in the direction of propagation of the beams:
an input lens,
a colour filter,
an output lens,
the input lens, located after the image plane of the first lens, converting the beams into parallel beams for passing through the colour filter,
the colour filter being formed by a set of filter, each filter of the set of filters is associated with an analysed colour and is placeable in the path of the light beams at the exit of the input lens,
the output lens located downstream of the colour filter, receiving the parallel beams leaving the filter and focussing them onto the detectors, and
the circuit controls the switching of the colour filters.

2. The device of claim 1 wherein the diaphragm is the optical conjugate of the elementary surface and defines the image projected on the detectors, the diaphragm being placed upstream of the output lens.

3. The device of claim 1 further comprising a semitransparent plate for sampling a fraction of the light beams and a transfer lens and an eyepiece for imaging the sampled light beams whereby a measurement zone is viewable.

4. The device of claim 3, wherein the semitransparent plate is placed between the diaphragm and the output lens.

5. The device of claim 2 further comprising a semitransparent plate for sampling a fraction of the light beams and a transfer lens and an eye-piece for imaging the sampled light beams whereby a measurement zone is viewable.

* * * * *